UNITED STATES PATENT OFFICE.

MICHAEL J. WALSH, OF PHILADELPHIA, PENNSYLVANIA.

FILLER AND POLISH COMPOSITION.

1,362,907.  Specification of Letters Patent.  Patented Dec. 21, 1920.

No Drawing.  Application filed November 16, 1918.  Serial No. 262,796.

*To all whom it may concern:*

Be it known that I, MICHAEL J. WALSH, a citizen of the United States, and a resident of Germantown, in the city of Philadelphia, county of Philadelphia, State of Pennsylvania, have invented a certain new and useful Filler and Polish Composition, of which the following is a specification.

My invention resides in a compound adapted for use in any of the arts in which a filler and polish, possessing characteristics as such, is desirable, and it is especially adapted for use as a filler and polish for automobiles, articles of furniture, doors, moldings and other equipment of buildings, and such other articles where a filler and polish of any sort may be used for the purposes herein specified, and any suitably painted metal, woods or other substantially similar materials which may be subject to injury by scratches, stains, roughing and other changes in appearance.

The principal object of my invention is to compose a compound adapted for the purposes hereinbefore referred to, and more particularly for filling in and polishing scratches or grooves produced in the surface coatings of painted, enameled or otherwise coated surfaces, as a repairing agent, acting in many instances as a cementitious compound uniting and adhering with the adjacent coating material and capable of receiving a polish in accordance with the surface being repaired, whereby all the marks, scratches and other blemishes are substantially obliterated and the surface made to appear as new and uninjured. It also has further utility as a polish only when applied to any surface blemished merely in its gloss or sheen characteristics restoring and making brighter the original luster of the surface and also tends to maintain the same permanently.

As a further object, the compound is useful as a stain or coloration remover, thereby restoring the original color character of the surface treated, as well as an excellent cleaning agent, particularly in the removal of greases, etc. It is, therefore, also useful in cleaning the hands.

Further and other objects will be disclosed with their various and novel features and characteristics.

In the production of my invention I combine suitable constituents, preferably in the proportions of five parts of an oil, as mineral straw oil, three parts of a preservative, or an expressible or extractive fluid of a plant or fruit, such as fermented fruit juices, a minute part of coloring matter, such as national scarlet, and one part of a volatile oil, as oil of citron. By national scarlet I mean a dye substance formerly known under the name of "croceine scarlet." This mass or mixture may be treated by first filtering or passing the same through a filter and then placing the filtered mixture or residue in a mixer comprising a container in which is included an agitator of any suitable type. The mixture then may be agitated thereby while at the same time air may be forced upwardly through the mass for air contact with or aerating thereof. The latter removes certain impurities that are usually present in some of the ingredients used. As an example, fruit juices ordinarily have thick clogs and the action of the air is to remove the same. The air also aids in agitating the mixture. The composition then may be refined by passing the same through a filter of any suitable type, such as a filter cloth. Any foreign matter produced by the corrosion of the agitator will be removed by the last mentioned filter from the mass or mixture. In mixing the ingredients it is found to be convenient to mix the coloring material and the oil of citron together apart from the other ingredients, and then to mix the other ingredients together. The first mixture then may be added to the second mixture. This, however, is not essential as the ingredients may be first mixed all together but it has been found very convenient to mix them in the manner above indicated.

It is to be understood that by mineral oil I mean any good mineral oil, such as paraffin oil about 28° Bé., of a straw or light yellow or other pale color, the tint or shade of which may be readily changed or modified by the admixture thereto of a small amount of any suitable coloring matter. As an instance of a fermented fruit juice, I might mention fermented apple juice or cider, but I do not intend to limit myself to the use of this particular juice, inasmuch as any other similar alcoholic ingredient may be substituted therefor without departing from the spirit and scope of my invention. National scarlet is a pigment which can be used in my composition to adapt it for use on quite a number of different colored surfaces, but it is to be understood that where a different or a more pronounced color is desired, any other dye or pigment of a suitable color may be substituted therefor.

While the proportions of the ingredients of the compound may be varied within certain limits, the proportions given above are given merely for the purpose of illustration, and such variations as may be desirable may be resorted to as becomes necessary to produce the satisfactory resultant product possessing the desired characteristics mentioned above. The proportions indicated have been found most useful and satisfactory as a filler and polish for the painted or enameled surfaces of the metal and wood parts of automobiles, such as, for example, the metal parts, the wind shield, the dash board, etc. The compound is relatively stable and it may be maintained in its original form or condition indefinitely without danger of deterioration. The oil of citron, besides acting as a fumigator, also contributes to a large extent to the polishing efficacy of the compound.

In its application, small portions of the compound may be applied to a crack, crevice, scratch or other injured part with the fingers, a piece of cloth, a brush, or any other suitable means, and pemitted to harden or set and dry into place and adhere to the material, whether it be the adjacent paint, enamel, or similar coating substance, or the metal, wood or like material treated. The same may then be polished in the usual way of producing luster upon coated surfaces, as by the rubbing of a cloth, or even paper, thereover. It is useful, therefore, in that it does not necessitate the use of a chamois. The compound also has the faculty of assuming the same color aspect as the original surface emitted, this being due principally to the substantial transparency of the composition as applied. Where there is a comparatively deep injury to the surface, several applications may be made with essentially the same result as in the cases of slight impairment. In the case, for example, of deep scratches or abrasions upon the surface of automobiles, a few daily treatments will produce the desired effect. The compound also possesses the important characteristic of being highly resistant to the adherence of dust particles. In this particular any dust that has accumulated upon a surface treated by the aforesaid compound is readily removed by merely brushing or wiping off.

The proportions of ingredients above given are by volume.

Having thus described my invention, what I claim and desire to protect by Letters Patent is:

1. A filling and polishing composition consisting of a mineral oil, an alcoholic solution, a dye and a volatile oil.

2. A filling and polishing compound consisting of a mineral oil, a fruit juice containing alcohol, a coloring agent and a volatile oil.

3. A filling and polishing compound consisting of a paraffin oil, a fermented fruit juice, a coloring agent and oil of citron.

4. A filling and polishing compound consisting of mineral straw oil, an extractive and expressible fruit fluid, coloring matter, and a volatile oil.

5. A filling and polishing compound comprising a large portion of mineral straw oil, a smaller portion of a fermented fruit juice containing alcohol, a still smaller portion of oil of citron and a minute portion of national scarlet.

6. A filling and polishing compound comprising ingredients in the proportions of five parts of mineral straw oil, three parts of a fermented fruit juice containing alcohol, a minute part of national scarlet and one part of oil of citron.

7. A filling and polishing composition consisting of a paraffin oil, a fermented fruit juice containing alcohol, coloring matter and a fragrant volatile oil.

8. A filling and polishing composition comprising a paraffin oil, a fruit juice containing alcohol in solution, coloring matter and oil of citron.

In witness whereof, I have hereunto set my hand this 14th day of November, 1918.

MICHAEL J. WALSH.